United States Patent
Qi

(10) Patent No.: US 12,113,724 B2
(45) Date of Patent: Oct. 8, 2024

(54) METHOD AND APPARATUS FOR PROVIDING A POSITIONAL REFERENCE SIGNAL IN A MOBILE COMMUNICATION SYSTEM

(71) Applicant: Samsung Electronics Co., Ltd., Suwon-si (KR)

(72) Inventor: Yinan Qi, Staines (GB)

(*) Notice: Subject to any disclaimer, the term of this patent is extended or adjusted under 35 U.S.C. 154(b) by 498 days.

(21) Appl. No.: 17/250,556

(22) PCT Filed: Aug. 1, 2019

(86) PCT No.: PCT/KR2019/009621
§ 371 (c)(1),
(2) Date: Feb. 2, 2021

(87) PCT Pub. No.: WO2020/027604
PCT Pub. Date: Feb. 6, 2020

(65) Prior Publication Data
US 2021/0176022 A1    Jun. 10, 2021

(30) Foreign Application Priority Data

Aug. 2, 2018 (GB) .................................. 1812598
Aug. 3, 2018 (GB) .................................. 1812690

(51) Int. Cl.
*H04L 5/00* (2006.01)
*H04L 5/02* (2006.01)
*H04W 64/00* (2009.01)

(52) U.S. Cl.
CPC .......... *H04L 5/0005* (2013.01); *H04L 5/0094* (2013.01); *H04L 5/02* (2013.01); *H04W 64/00* (2013.01)

(58) Field of Classification Search
None
See application file for complete search history.

(56) References Cited

U.S. PATENT DOCUMENTS 10,869,165 B2    12/2020   Yamada et al.
2010/0195566 A1   8/2010   Krishnamurthy et al.
(Continued)

FOREIGN PATENT DOCUMENTS

EP       3780465 A1       2/2021
WO    2010151217 A2     12/2010
(Continued)

OTHER PUBLICATIONS

"Search and Examination Report under Sections 17 & 18(3)" issued Mar. 22, 2021, in connection with GB Patent Application No. 1812690.4, 4 pages.
(Continued)

*Primary Examiner* — Suhail Khan

(57) ABSTRACT

Disclosed is a method of providing a positional reference signal in a communication system comprising the step of: providing a positional reference signal which is configurable in both time and frequency domains. Also disclosed is a method of configuring a periodicity of a positioning reference signal transmission in a communication system comprising the step of configuring the starting timing and the duration of the positioning reference signal transmission, wherein the transmission is either consecutive or interleaved on cell or cell group basis, and the configuration is numerology dependent.

20 Claims, 9 Drawing Sheets

(56) References Cited

U.S. PATENT DOCUMENTS

| | | |
|---|---|---|
| 2010/0260154 A1 | 10/2010 | Frank et al. |
| 2011/0176499 A1 | 7/2011 | Siomina et al. |
| 2017/0214508 A1 | 7/2017 | Lee et al. |
| 2018/0054792 A1 | 2/2018 | Lee et al. |
| 2019/0123864 A1* | 4/2019 | Zhang .................. H04W 16/28 |
| 2020/0196272 A1* | 6/2020 | Xiong .................. G01S 5/0236 |
| 2021/0203460 A1* | 7/2021 | Da ....................... H04W 64/006 |
| 2021/0250892 A1 | 8/2021 | Kim |
| 2021/0282111 A1* | 9/2021 | Yamada ................ H04L 5/0051 |

FOREIGN PATENT DOCUMENTS

| | | |
|---|---|---|
| WO | 2011003030 A1 | 1/2011 |
| WO | 2017029213 A1 | 2/2017 |
| WO | 2017184865 A1 | 10/2017 |
| WO | 2018025794 A1 | 2/2018 |
| WO | 2018144667 A1 | 8/2018 |
| WO | 2019182401 A1 | 9/2019 |

OTHER PUBLICATIONS

International Search Report and Written Opinion of the International Searching Authority in connection with International Application No. PCT/KR2019/009621 dated Nov. 21, 2019, 12 pages.
Combined Search and Examination Report under Sections 17 and 18(3) dated Feb. 4, 2019 in connection with United Kingdom Application No. GB1812690.4, 7 pages.
3GPP TS 36.211 V15.2.0 (Jun. 2018), Technical Specification, 3rd Generation Partnership Project; Technical Specification Group Radio Access Network; Evolved Universal Terrestrial Radio Access (E-UTRA); Physical channels and modulation (Release 15), Jun. 2018, 101 pages.

* cited by examiner

METHOD AND APPARATUS FOR PROVIDING A POSITIONAL REFERENCE SIGNAL IN A MOBILE COMMUNICATION SYSTEM

CROSS-REFERENCE TO RELATED APPLICATIONS

This application is a 371 National Stage of International Application No. PCT/KR2019/009621, filed Aug. 1, 2019, which claims priority to United Kingdom Patent Application No. 1812598.9, filed Aug. 2, 2018, and United Kingdom Patent Application No. 1812690.4, filed Aug. 3, 2018, the disclosures of which are herein incorporated by reference in their entirety.

BACKGROUND

1. Field

The present disclosure relates to method and apparatus for providing a positional reference signal in a mobile communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

A method of providing a positional reference signal in a communication system is provided. The method comprises the step of providing a positional reference signal which is configurable in both time and frequency domains.

DETAILED DESCRIPTION

Figure 1:
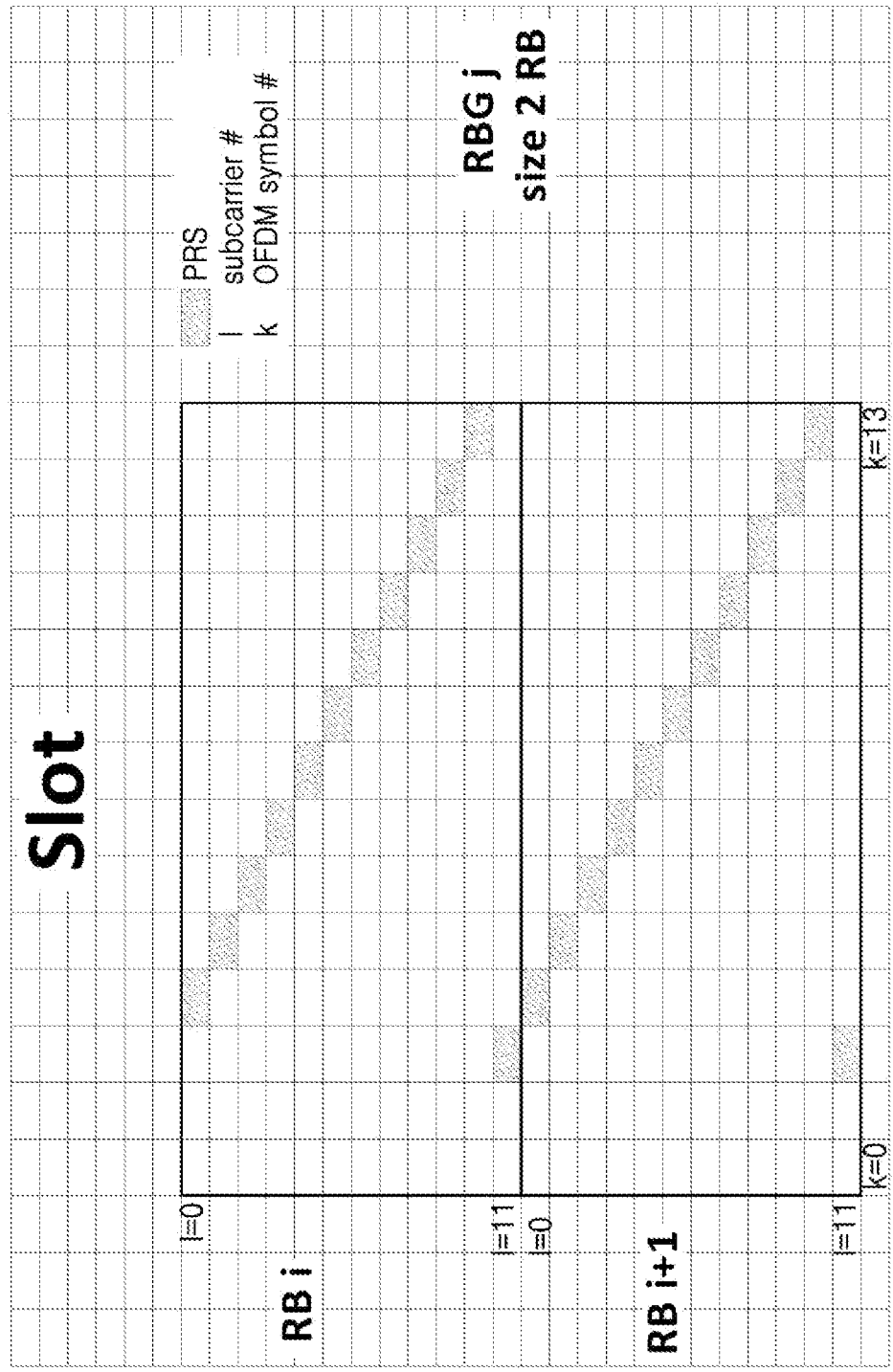
FIG. 1 shows RBG based PRS configuration according to an embodiment of the present disclosure.

According to a first aspect of the present disclosure, there is provided a method of providing a positional reference signal in a communication system comprising the step of: providing a positional reference signal which is configurable in both time and frequency domains.

In an embodiment, the configuration of the positional reference signal comprises one or more of configuring its pattern and configuring its density.

In an embodiment, the positional reference signal is configured in terms of a pattern distributed across a Resource Block Group comprising a plurality of resource blocks.

In an embodiment, positioning reference signals are configured to occupy a number of time-frequency resources whereby the number is variable and is controlled either by explicit signalling from the communication system or derived implicitly.

In an embodiment, positioning reference signals are configured to occupy a number of time-frequency resources with a specific pattern/density whereby the pattern/density is variable and is controlled either by explicit signalling from the communication system or derived implicitly.

In an embodiment, a table with multiple thresholds is established for implicit derivation and the multiple thresholds can be predefined or configured by upper layers and are based on previous and/or current measurement and/or UE status In an embodiment, the UE status comprises one or more of signal strength in terms of RSRP, RSRQ, RSSI, SINR, Doppler, MCS level, speed of UE and BW.

In an embodiment, a location index of positioning reference signal resource elements follows a pseudo-random sequence.

In an embodiment, positional reference signal provision is User Equipment, UE, specific and two UEs are provided with positional reference signal by means of orthogonal resource allocation.

In an embodiment, a User Equipment measures one or more positioning reference signals by means of a window in the time domain having a configurable duration.

In an embodiment, a User Equipment measures one or more positioning reference signals by means of a window in the frequency domain having a configurable bandwidth.

In an embodiment, a larger window leads to greater positional accuracy and vice-versa.

In an embodiment, there is further the step of exchanging information from a UE capability report with positional protocols to determine positioning requirements for each UE.

According to a second aspect of the present disclosure, there is provided a base station arranged to perform the method of the first aspect.

According to a third aspect of the present disclosure, there is provided a method of configuring a periodicity of a positioning reference signal transmission in a communication system comprising the step of configuring the starting timing and the duration of the positioning reference signal transmission, wherein the transmission is either consecutive or interleaved on cell or cell group basis, and the configuration is numerology dependent.

In an embodiment, the step of configuring comprises configuring a multi-level structure for a positioning reference signal.

In an embodiment, beamforming and beam sweeping is used to transmit the positioning reference signal.

In an embodiment, the multi-level structure comprises the steps of defining a positioning reference signal block set, comprising a plurality of block sub-sets, each further comprising a plurality of blocks, with each block comprising a plurality of consecutive symbols or mini slots or slots or subframes or frames.

In an embodiment, the positioning reference signal block set is repeated with a defined periodicity.

In an embodiment, the location of a positioning reference signal block is defined by the equation $A+B*n$, where A defines the starting location of the positioning reference signal block and belongs to a set with size of the block within one block sub-set; B defines the step of the block subset in time domain; and n defines the number of block sub-sets within one block set.

In an embodiment, multiple positioning reference signal are transmitted simultaneously but differentiated by SDM or FDM.

In an embodiment, the configuration of positioning reference signals is arranged to avoid symbols for uplink transmission in a selected slot format.

In an embodiment, the configuration of positioning reference signals is User Equipment, UE, specific, based on explicit UE reports or by implicit derivation by Base Stations, gNBs.

In an embodiment, the reference signal used for positioning is selected from one or more of SS, CSI-RS, SRS, DMRS, PTRS.

In an embodiment, the configuration information of positioning reference signals is exchanged between upper layer protocols, such as RRC and LPP, and/or exchanged between measurement units, such as LMU.

Although a few preferred embodiments of the present disclosure have been shown and described, it will be appreciated by those skilled in the art that various changes and modifications might be made without departing from the scope of the disclosure, as defined in the appended claims.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions. In the disclosure, a DL is a wireless transmission path of a signal transmitted from a base station to a terminal, and a UL is a wireless transmission path of a signal transmitted from a terminal to a base station. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system.

The present disclosure relates to improvements in Location based Services (LBS) used in mobile communication networks to provide location information of a particular User Equipment (UE).

Demand for mobile services is expanding quickly and one of the fastest growing segments is Location Based Services (LBS), primarily driven by two major requirements: emergency services and commercial applications. Emergency services desire to know the location of a UE in the event of, for instance, a vehicular accident. Commercial applications desire to know the location of a UE so that the user can be presented with relevant information or advertisements such as, for instance, restaurant deals in his vicinity.

In response to these needs, second and third generation networks (WCDMA, GSM, CDMA) have added support for several positioning technologies, which vary in their accuracy and Time to First Fix (TTFF) performance. 3GPP Release 9 for LTE defines support for various positioning technologies: Extended Cell ID (ECID), Assisted Global Navigation Satellite System (A-GNSS), Observed Time Difference Of Arrival (OTDOA) and LTE Positioning Protocol (LPP), a new positioning protocol. A new reference signal, i.e. positioning reference signal (PRS) has been defined in LTE, to support this new protocol.

Further in Release 11 of LTE, Uplink Observed Time Different of Arrival (UOTDA) has been adopted using Sounding Reference Signal (SRS) measurement. 3GPP Release 15 defines support for some (Radio Access Technology) RAT-independent positioning techniques, such as Real Time Kinematic (RTK) GNSS, to improve the accuracy of LTE positioning.

It is an aim of embodiments of the present disclosure to address problems with the prior art, whether mentioned explicitly herein or not.

According to the present disclosure there is provided an apparatus and method as set forth in the appended claims. Other features of the disclosure will be apparent from the dependent claims, and the description which follows.

Embodiments of the present disclosure provide system configurations, in terms of reference signal designs, which provide advantageous solutions for LBS.

Reference Signal (RS) Periodicity design for positioning can vary due to different positioning techniques applied. For OTDOA, periodicity refers to PRS transmission periodicity. For ECID or UOTDA, periodicity refers to the periodicity of other downlink (DL), e.g., synchronization signal (SS), and/or uplink (UL) signals, e.g., SRS.

In LTE systems, two PRS are located with 6 resource element (RE) difference so that a UE can measure PRS from up to 6 cells in one subframe. If more than 6 cells need to be measured to achieve higher accuracy positioning, the UE can measure the PRS in multiple subframes. However, in New Radio (NR) or Fifth Generation (5G), high speed UEs need to be considered and the actual location of the UE might change significantly from one slot to another slot. In addition, high accuracy positioning of the UE should also be considered. Therefore, it is desirable that a UE can measure PRS from more cells in a very short time, e.g., one or a few consecutive slots.

In order to increase the number of cells measured, PRS Resource Element (RE) distance may be increased and PRS can be jointly allocated to a group of RBs as shown in FIG. 1 instead of only one RB as in the LTE system. FIG. 1 shows a grouping of 2 RBs-Rbi and RBi+1.

The grouping of RBs can be configured by upper layers. For example, the concept of an RB group (RBG) can be used, which is configured by upper layers and represents the minimum schedule resource grid.

FIG. 1 shows RBG based PRS configuration according to an embodiment of the present disclosure.

In FIG. 1, PRS is configured per RBG (RBG size=2) and the PRS RE difference is increased to 12, which means a maximum of 12 cells can be measured at the same time with improved hearability. Other configurations and RBG sizes are also possible by grouping different numbers of RBs.

Figure 2:
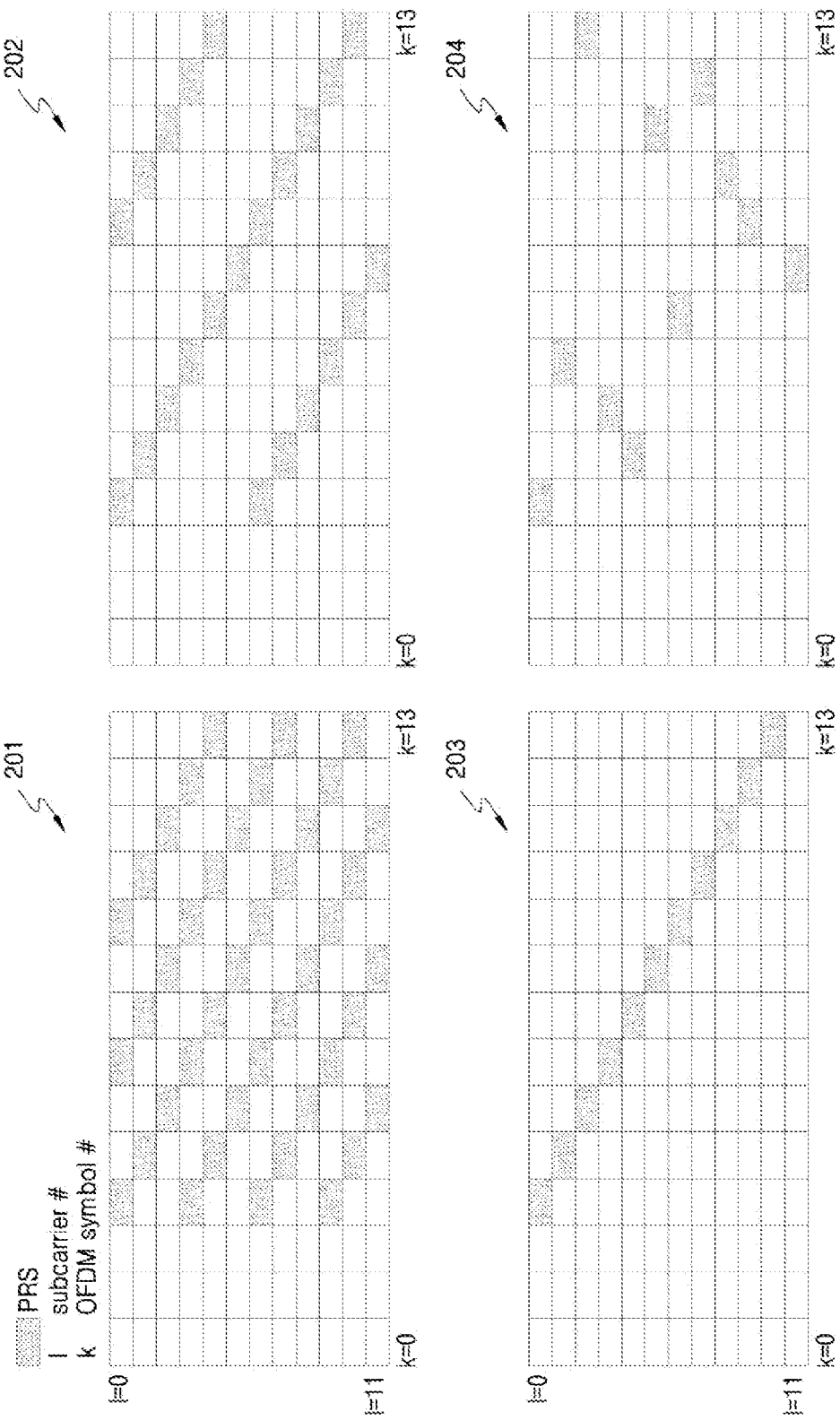
FIG. 2 shows Configurable PRS pattern/density according to an embodiment of the present disclosure.

Only one PRS density is configured in the LTE system. Considering the vastly diverse requirements in terms of speed and accuracy for all the different use cases in NR, a single PRS pattern/density is not sufficient. In addition, Internet of Things (IoT) devices may have additional requirements, such as low power consumption, since their batteries are expected to last an extremely long time without replacement. This means that PRS measurement should not be too frequent, to avoid draining the batteries unnecessarily. In this regard, NR may support configurable PRS pattern/density as shown in the examples in the FIG. 2 which shows that PRS density can be configured as (201) 1 PRS per 3, (202) 1 PRS per 6 and (203) 1 PRS per 12 subcarriers. 204 of FIG. 2 shows a different PRS pattern, i.e. a pseudo-random pattern, which can also be configured according to previous and/or current UE status and/or measurement results and/or positioning requirements.

Three alternative configurations forming embodiments of the disclosure are:
 1: Explicit signalling from upper layers or lower layers, e.g., DCI, can be used to configure the PRS pattern/density. Upper layer signalling might be semi-persistent but requires less signalling overhead than low layers. Lower layer signalling is more dynamic but requires a higher signalling overhead.
    The PRS pattern/density to be configured can be based on previous and/or current measurement, e.g., UE speed, and/or other positioning requirements, e.g., accuracy, and/or other factors such as bandwidth (BW).
 2: PRS pattern/density is implicitly derived. The implicit derivation can be based on previous and/or current measurement, e.g., signal strength in terms of RSRP, RSRQ, RSSI, SINR, Doppler, MCS level, speed of UE, BW, etc. A table with multiple thresholds may be established for this purpose. For example, when received signal strength is above a certain threshold, a specific PRS pattern/density is assumed by the UE and if received signal strength is lower than that threshold, another PRS pattern/density is assumed by the UE.
 3: A combination of Alternatives 1 and 2 above. Alternative 2 may serve as a default setting and if explicit signalling is configured, then PRS pattern/density may follow such explicit configuration.

The bandwidth of PRS is directly relevant to positioning accuracy in terms of time resolution. The obtainable time resolution is equivalent to the inverse of the bandwidth used to observe the signal at baseband in the granularity of '1/BW'. An NR UE may not be able to support the entire BW that can be configured by the base station (gNB). In this regard, PRS BW adaptation may be supported in NR, which will be described hereafter.

For UE specific configuration, it is easy to configure different patterns/densities for different UEs associated with the same serving cell due to orthogonal resource allocation. However, a more complicated situation is expected and is as shown in FIG. 3.

Figure 3:
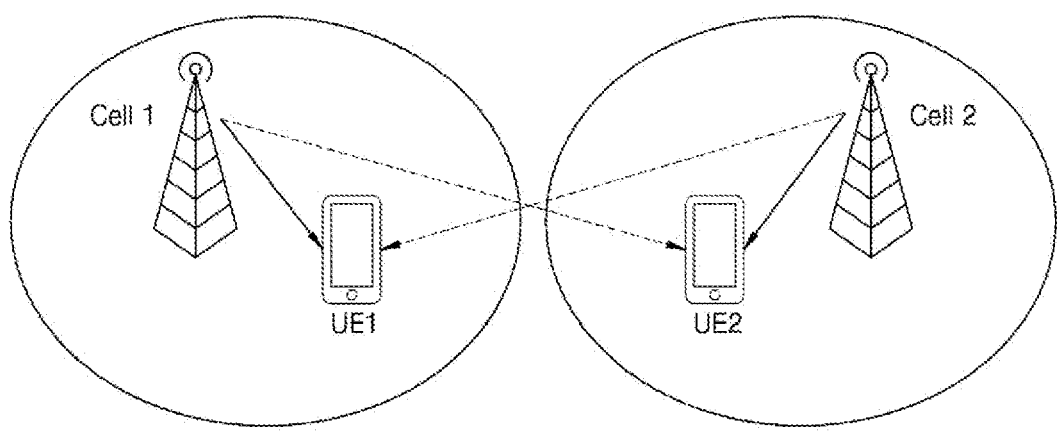
FIG. 3 shows Positioning with multiple UEs and cells according to an embodiment of the present disclosure.

FIG. 3 shows Positioning with multiple UEs and cells according to an embodiment of the present disclosure.

In FIG. 3, Cell 1 and Cell 2 are the serving cells for UE1 and UE2, respectively. If resource allocation of UE1 is solely done by Cell 1 and UE2 by Cell 2, the resources allocated to the two UEs might overlap due to the independent resource allocation from the two cells, Cell 1 and Cell 2. In such a case, if a different PRS pattern/density is configured for the two UEs, a means to differentiate two PRS patterns/densities is required.

Moreover, for cell-specific configuration (as opposed to UE-specific), the same PRS pattern/density is configured for all the UEs in a cell even though these UEs might have different positioning requirements. The same question as raised above arises: how to configure multiple PRS pattern/density in the same time-frequency resources?

The following alternative embodiments are presented:
1: The pattern with highest density and/or shortest periodicity is always configured and shared by all the UEs. This guarantees that the positioning requirements of all UEs can be met but it is not efficient since it requires highest resource usage and highest UE power consumption.
2: As in 1 above, the pattern with highest density and/or shortest periodicity is configured and shared by all the UEs to guarantee that the positioning requirements of all UEs can be met.

Figure 4:
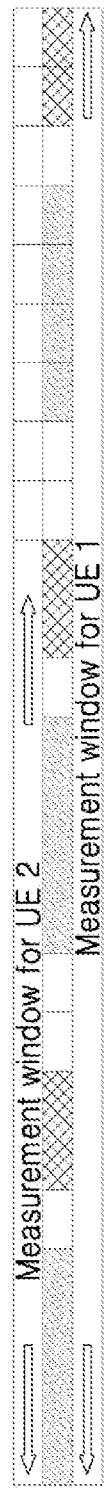
FIG. 4 shows UE measurement configuration according to an embodiment of the present disclosure.

However, in order to save UE power consumption, especially for IoT devices with stringent power consumption requirements, a different measurement window for density and/or periodicity can be configured for different UEs as shown in FIG. 4.

FIG. 4 shows UE measurement configuration according to an embodiment of the present disclosure.

In FIG. 4, one UE with higher accuracy requirement can measure all the PRS (shaded and cross-hatched) with a longer window (represented by "measurement window for UE1") configured whereby measurement is more frequent.

However, for another UE with lower accuracy requirement but more stringent power consumption requirement, a shorter window (represented by "measurement window for UE2") can be configured whereby measurement is less frequent, e.g., measuring only cross-hatched PRS.

3: Different PRS pattern/density can be Frequency Division Multiplexed (FDMed) in frequency domain or Time Division Multiplexed (TDMed) in time domain, to serve UEs with different positioning requirements.
4: It is possible to combine some or all of the above referenced alternatives 1-3.

For PRS BW adaptation, embodiments similar to those above are presented:
1: Largest BW is always configured and shared by all the UEs but different measurement windows are defined in frequency domain as shown in FIG. 5 according to required time resolution, UE capability, etc.

Figure 5:
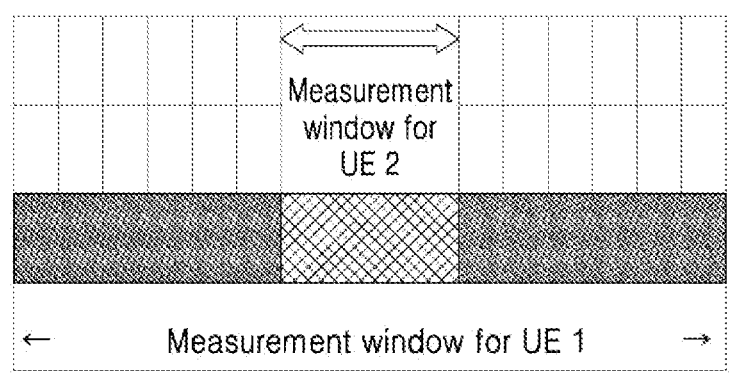
FIG. 5 shows Frequency domain measurement window configuration according to an embodiment of the present disclosure.

FIG. 5 shows Frequency domain measurement window configuration according to an embodiment of the present disclosure FIG. 5 shows a larger measurement window for UE 1, which measures both shaded and cross-hatched PRS. The smaller measurement window for UE 2 measures only the cross-hatched PRS.

2: Different PRS BW can be FDMed in frequency domain or TDMed in time domain to serve UEs with different positioning requirements.
3: Combination of 1 and 2 above.

Other positioning schemes, e.g., UTDOA, E-CID, etc., based on UL reference signal measurement may also be supported in NR. Positioning reference signals to be used in UL can be SRS, DMRS, PTRS or an additional RS, if needed.

If an additional RS is defined in UL, the same principles and configurations introduced above can also be applied to provide high flexibility. If existing RSs are used, the current configuration provides high flexibility. However, how accurate positioning can be achieved might depend on the RS configurations that a UE can support, e.g., number of ports, pattern, density, periodicity, BW, etc. This capability information can be obtained from UE capability report and such information should be conveyed to positional protocols, e.g., LPP, so that LPP can determine reasonable positioning requirements for each UE.

Positioning Reference Signal (PRS) periodicity is configured by upper layers, e.g., LPP/RRC, and the configuration is highly flexible so that different requirements for a variety of different use cases can be met without causing too much signalling overhead. For example, the minimum periodicity value should be smaller than required time to first fix (TTFF) and there might be other requirements imposed by different use cases. Considering that New Radio (NR) supports multiple numerology and thus multiple slot durations, the periodicity can be defined in different ways.

In a first embodiment, periodicity is defined on a slot or mini slot basis, i.e., periodicity can be defined as N slots/mini slots and N is selected from a group of values pre-defined, e.g., N can be chosen as $K*2n$ and $n$ can be from 0 to nmax.

In a second embodiment, periodicity is defined on a subframe basis, i.e., periodicity can be defined as N subframes and N is selected from a group of values pre-defined, e.g., N can be chosen as $K*2n$ and $n$ can be from 0 to nmax.

In a third embodiment, periodicity is defined in absolute time units, e.g., milliseconds. Periodicity can be defined as N absolute time units and N is selected from a group of values pre-defined, e.g., N can be chosen as $K*2n$ and $n$ can be from 0 to nmax.

K may be pre-defined and the smaller the value of K is, the finer the time resolution that can be provided. However, to serve different use cases, K can also be configured by upper layers to provide more flexibility.

For the first embodiment, above, since slot duration might be different for different numerologies, the actual periodicity, in terms of absolute time, changes with slot duration or numerology.

For the second embodiment, above, the duration of the subframe is constant for all numerologies and the actual periodicity, in terms of absolute time, does not change.

For the third embodiment, above, the actual periodicity in terms of absolute time does not change either.

Periodicity configurations for multiple numerologies can be based on one of the following alternatives:
Uniform periodicity design for all numerology and the periodicity values can be defined in the two tables as shown below. Compared with a LTE table, these tables may be expanded to meet the diverse requirements of all NR use cases as shown below.

TABLE 1

| PRS periodicity $T_{PRS}$ (slots) |
| --- |
| K |
| 2K |
| 4K |
| 8K |
| 16K |
| 32K |
| 64K |
| 128K |
| 256K |
| 512K |
| 1024K |
| 2048K |
| 5096K |
| Reserved |

TABLE 2

| K (slots) |
| --- |
| 1 |
| 2 |
| 4 |
| 5 |
| 10 |
| 20 |
| 40 |
| Reserved |

Periodicity can be defined per numerology and for each numerology, the periodicity values can be defined in a table so that multiple tables are needed as shown below.

TABLE 3

| PRS periodicity for Numerology 1 $T_{PRS}$ (slots) |
| --- |
| K |
| 2K |
| 4K |
| 8K |
| 16K |
| 32K |
| 64K |
| Reserved |

TABLE 4

| PRS periodicity for Numerology 2 $T_{PRS}$ (slots) |
| --- |
| 64K |
| 128K |
| 256K |
| 512K |
| 1024K |
| 2048K |
| 5096K |
| Reserved |

A benefit of the first alternative above is that only one table is needed. However, a disadvantage is that the table can be very large since it should include all possible values. If multiple periodicity tables are defined per numerology, each individual table can be smaller. Which table and which periodicity values to choose are configured by upper layers, e.g., LPP. In the latter case, numerology configuration is conveyed and known to the positioning protocols, e.g., LPP or units, e.g., Location Measurement Unit (LMU).

There are several options available when considering which slot, mini slot or subframe to configure with PRS as follows:

Option 1: The slots/mini slots/subframes configured with PRS from one cell or a group of cells are consecutive in the time domain. In such a case, two parameters are needed: starting point and duration. These parameters can be configured by upper layers, e.g., LPP/RRC.

Option 2: The slots/mini slots/subframes configured with PRS from one cell or a group of cells are discontinuous and follows a certain pattern, which could be either pre-defined, or generated based on cell ID, e.g., PCI or cell group ID, or configured by upper layers, e.g., LPP/RRC. However, N consecutive slots/mini slots/subframes are configured for multiple cell/cell groups and N is configured by upper layers. In this option, the starting point of the N consecutive slots/mini slots/subframes is still needed as well as the duration, i.e., N. In addition, the time domain pattern should also be known.

Figure 6:
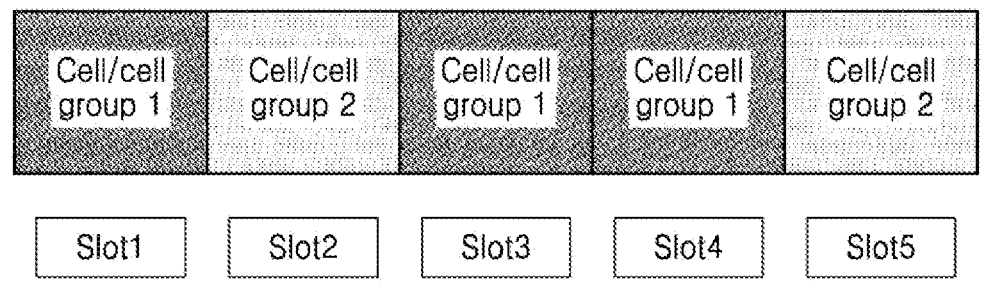
FIG. 6 shows PRS configuration for multiple cells/cell groups, according to an embodiment of the present disclosure.

FIG. 6 shows PRS configuration for multiple cells/cell groups, according to an embodiment of the present disclosure.

FIG. 6 shows an example of Option 2 above with two cell groups shown—Cell Group 1 and Cell Group 2. For NR, the cell density is expected to be much higher than LTE due to the requirement for high data rate and coverage. With Option 2, PRS can be configured to be present in more cells without causing too much interference and with the result that positioning accuracy can be improved. By defining and using Cell Groups in this manner, it is possible for the UE to receive a greater number of Reference Signals and so it is possible to calculate location to a greater degree of accuracy.

In NR, multiple slot formats are defined to provide enhanced flexibility. PRS is only configured to resources allocated for downlink (DL) transmission, i.e., PRS cannot be configured for slot format 1 and 8-15, since they have no provision for DL slots. There are two possible configurations in the light of this:

PRS is only configured to the slot formats without explicit uplink (UL) transmission, e.g., slot format 1, 8-15, 19-45, and 50-61 cannot be used for PRS; or PRS can be configured to the slot formats with explicit UL transmission except pure UL formats slot format 1 and 8-15. In such a case, the PRS are only configured to DL symbols and/or unknown symbols which can be used for DL as shown in FIG. 7, which shows, as an example, slot format 28.

Figure 7:
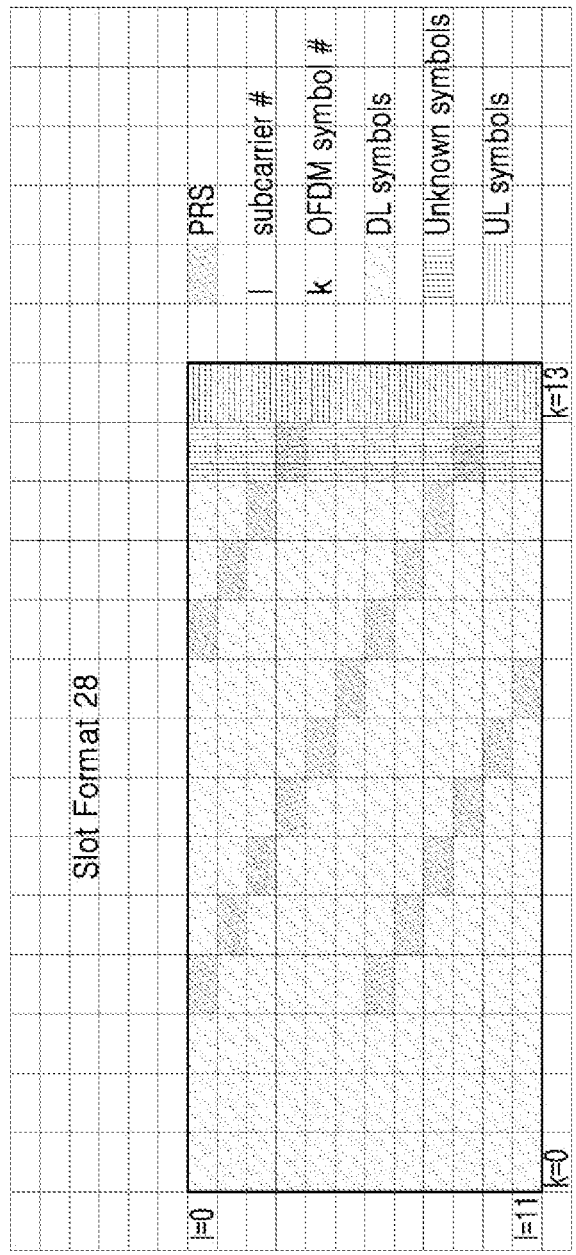
FIG. 7 shows PRS configuration for clot 28, according to an embodiment of the present disclosure.

FIG. 7 shows PRS configuration for clot 28, according to an embodiment of the present disclosure.

FIG. 7 shows slot format 28 as an example of a slot format which can accommodate PRS. As shown, PRS is present in a repeating pattern of OFDM symbols and subcarriers with the overall slot structure. It is not, however, present in the final symbol (k=13) since that is provisioned for UL symbols only. Since PRS is available as shown in DL, the UE can measure PRS and report back to the network which is then able to determine its position.

In both of the above cases, the slot format configuration information should be conveyed and known to the positioning protocols, e.g., LPP or units, e.g., LMU. It should be noted that the information exchange may happen between the UE and the cell (e.g. gNB or TRP), or within the same cell but between two protocols (e.g. between RRC and LPP).

The periodicity design can be applied to all the UEs within one cell/cell group (called herein cell-specific periodicity). However, if PRS is UE-specific, the following issues should be considered additionally.

Considering the very diverse use cases in NR, as well as the vastly different requirements imposed by these use cases, it is possible that different UEs might need different periodicity values. Periodicity values are configured by positioning protocols, i.e., LPP, but from the UE perspective, the periodicity is configured by RRC which wraps the LPP protocol data unit (PDU).

When periodicity is cell-specifically configured, only one periodicity value is needed for one cell/cell group per numerology and this may not be able to meet the requirements for all UEs covered in this cell. For example, for a UE moving at high speed, the periodicity should be small so that the UE location can be updated more frequently, but for a pedestrian case, a longer periodicity is feasible.

Since a small periodicity will cause high signalling overhead and thus lead to capacity loss, it is not desirable to configure a small periodicity for all the UEs. In such a case, LPP should configure multiple periodicity values per numerology as candidates and the cell can then configure suitable periodicity values to each individual UE based on their requirements, e.g., latency and positioning accuracy. This gives rise to three possible alternatives:

- The UE does not report its current status, e.g., moving speed, or requirements and the cell just configures the smallest periodicity to the UE based on numerology;
- The UE reports partial or full information regarding its current status and requirements and the cell configures suitable periodicity based on the report;
- The cells (i.e. all cells involved in positioning) jointly derive the UE information implicitly, e.g., frequency of handover, and exchange the information via X2 interface, then configure suitable periodicity to the UE.

PRS can be configured as periodic, aperiodic, or semi-persistent. Both aperiodic and semi-persistent PRS can be triggered by upper layers, e.g., LPP/RCC or DCI.

Figure 8:
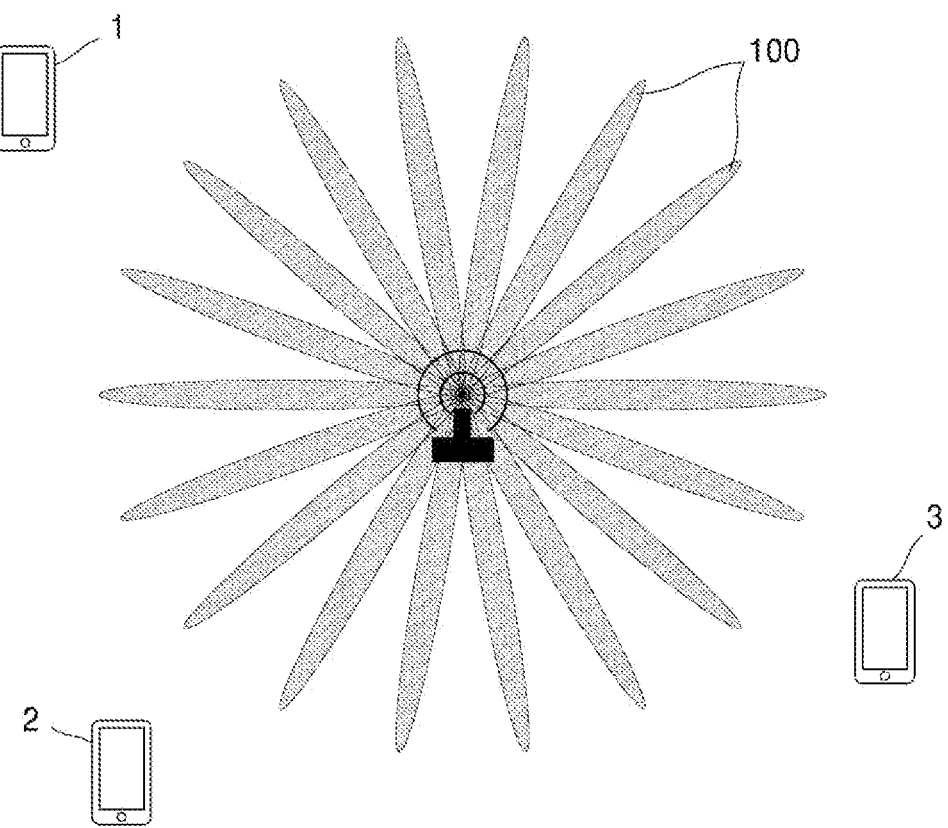
FIG. 8 shows PRS beam sweeping according to an embodiment of the present disclosure.

Another issue for PRS is that beamforming is needed in Frequency Band 2 (FR2, 24.24 GHz-52.6 GHz) so that PRS might also be beamformed and, in such a case, the PRS beam 100 should sweep to cover all possible directions as shown in FIG. 8, so that each of UEs 1, 2, 3 are able to receive the associated transmission.

FIG. 8 shows PRS beam sweeping according to an embodiment of the present disclosure.

In order to support beam sweeping, it is possible to define a multi-level PRS block set 200 which consists of n consecutive symbols/mini slots/slots/subframes/frames. Within each PRS block set 200, multiple PRS block sub-sets 210 can be defined and each PRS block sub-set consists of multiple PRS blocks 220 which could have either the same or different beam patterns. The multi-level structure is shown in FIG. 9.

Figure 9:
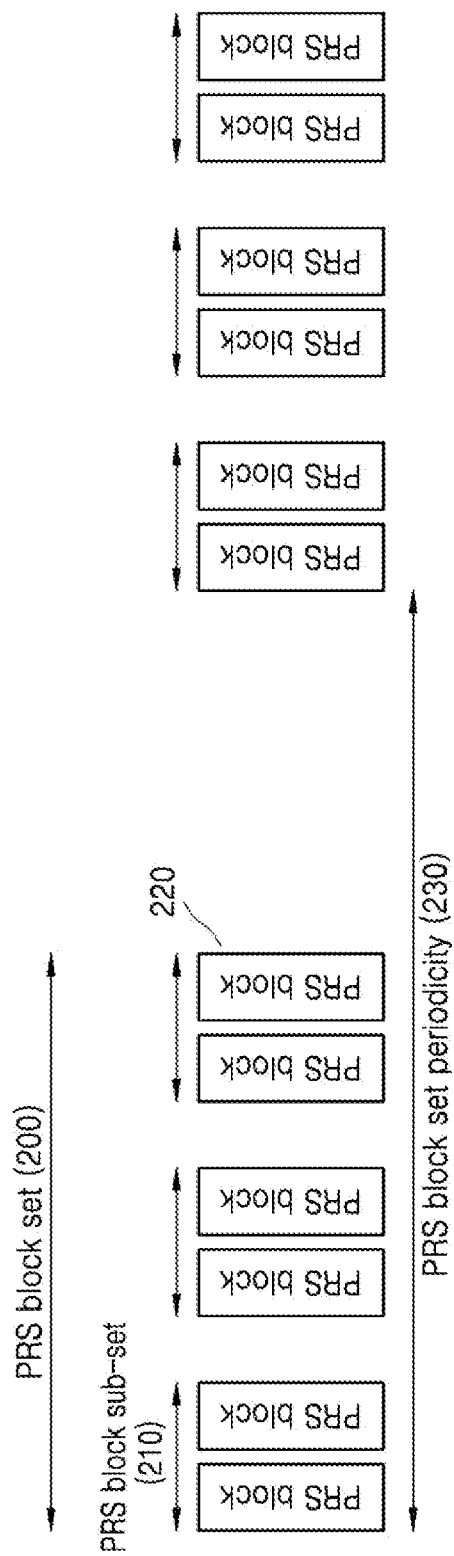
FIG. 9 shows a multi-level PRS structure according to an embodiment of the disclosure.

FIG. 9 shows a multi-level PRS structure according to an embodiment of the disclosure A UE assumes that reception occasions of a PRS block are in consecutive symbols/mini slots/slots/subframes/frames. If the UE has not been provided dedicated higher layer parameters, the UE may assume that the subcarrier spacing of PRS is the same as SS/PBCH blocks, otherwise, it can be signalled explicitly by upper layers or by means of broadcast information. The indexes for candidate PRS can be determined according to the subcarrier spacing of PRS.

For a certain case, with specific subcarrier spacing, the time location of PRS blocks can be defined by the following equation: $A+B*n$, where A defines the starting location of PRS block 220 and belongs to a set with size of the PRS block within one PRS block sub-set 210; B defines the step of PRS block subset in time domain and can be defined per sub-carrier; and n defines the number of PRS block sub-sets 220 within one PRS block set 200. With this multi-level PRS block structure, there may be a need to define multi-level periodicity, each corresponding to one level. For example, PRS block set periodicity 230 should be defined as shown in FIG. 9. In addition, PRS block sub-set periodicity and PRS block periodicity may be defined by configuring the value of A, B and n as needed. This multi-level structure can either be configured by upper layers or pre-defined based on factors such as carrier frequency, numerology, etc. It is also possible that multiple PRS blocks are transmitted simultaneously and these PRS blocks can be either overlapping in the same time-frequency resources but differentiated by SDM or FDM.

It should be noted that this multi-level structure can be quite flexible. The embodiment shown here in FIG. 9 has three levels but it can be reduced to two or extended to more than three levels as required.

For ECID, UE needs to measure signal strength, e.g. Reference Signal Received Power (RSRP) of synchronization signal (SS) in the DL and the cell/cell group needs to measure angle of arrival (AoA) in UL. For UL link AoA measurement, SRS is used for LTE. For NR, SRS, DMRS, PTRS can be considered. The problem associate with DMRS and PTRS is that they are only configured when there is data to be transmitted. However, considering positioning normally happens when UE is RRC Connected, it is still feasible to use DMRS and PTRS. For all the above alternatives, the periodicity can be configured by upper layers based on requirements.

For DL, things are different from two perspectives:
- SS periodicity is changed in NR and depends on numerology;
- In addition, UE can measure RSRP of Channel State Information Reference Signal (CSI-RS) in NR.

If SS is measured, the periodicity is configured in the cell-specific manner. However, if CSI-RS is measured, the periodicity is configured in the UE-specific manner by upper layers, e.g., RRC, and thus can be more flexible.

For UOTDA, the cell group measures the difference of time of arrival from the UE based on reference signals of the UE. Similar to ECID (described above), SRS, DMRS and PTRS can be considered in NR and the periodicity can be configured by upper layers based on particular requirements.

For both of the above cases, periodicity can be configured by LPP and then the information is exchanged between LPP and RRC.

Figure 10:
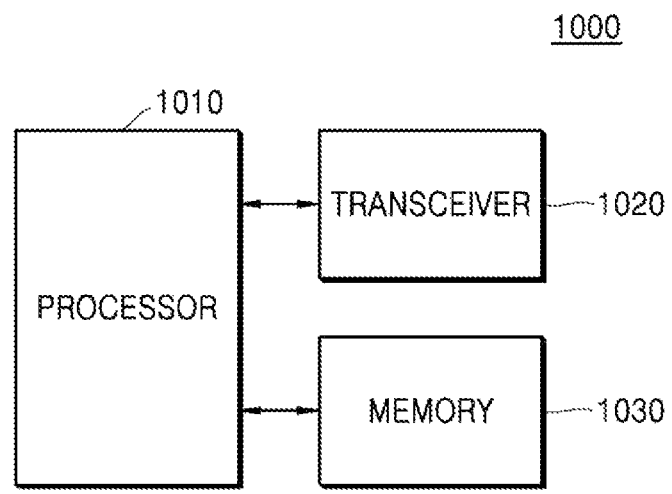
FIG. 10 is a block diagram illustrating a base station according to an exemplary embodiment of the present disclosure.

FIG. 10 is a block diagram illustrating a base station according to an exemplary embodiment of the present disclosure.

The base stations, eNBs, and gNBs described above may correspond to the base station 1000.

Referring to the FIG. 10, the base station 1000 may include a processor 1010, a transceiver 1020 and a memory 1030. However, all of the illustrated components are not essential. The base station 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the base station 1000 may be implemented by the processor 1010.

*159 The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the base station 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Figure 11:
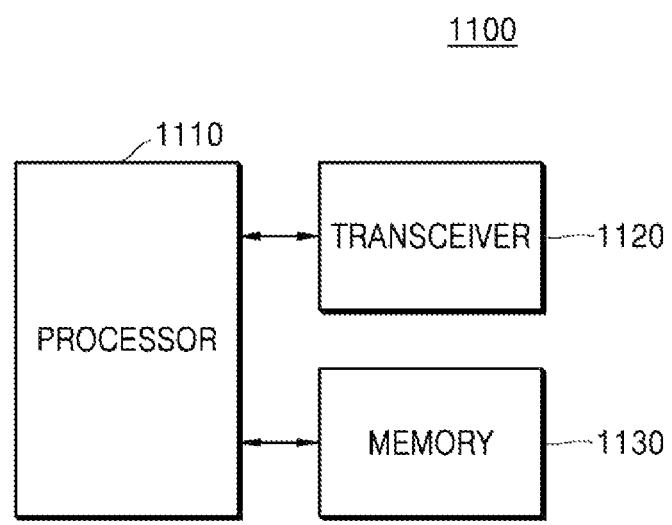
FIG. 11 is a block diagram illustrating a UE according to an exemplary embodiment of the present disclosure.

FIG. 11 is a block diagram illustrating a UE according to an exemplary embodiment of the present disclosure.

FIG. 11 schematically illustrates a User Equipment (UE) 1100 according to an embodiment of the present disclosure.

The UEs described above may correspond to the UE 1100.

Referring to the FIG. 11, the UE 1100 may include a processor 1110, a transceiver 1120 and a memory 1130. However, all of the illustrated components are not essential. The UE 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the UE 1100 may be implemented by the processor 1110.

The processor 1110 may detect a PDCCH on a configured control resource set. The processor 1110 determines a method for dividing CBs and a method for rate matching of a PDSCH according to the PDCCH. The processor 1110 may control the transceiver 1120 to receive the PDSCH according to the PDCCH. The processor 1110 may generate HARQ-ACK information according to the PDSCH. The processor 1110 may control the transceiver 1120 to transmit the HARQ-ACK information.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the UE 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

Although the present disclosure has been particularly shown and described with reference to exemplary embodiments thereof, it will be understood by those skilled in the art that various changes in form and details may be made therein without departing from the spirit and scope of the present disclosure as defined by the following claims.

The invention claimed is:

1. A method performed by a base station in a wireless communication system, the method comprising:
   transmitting positioning reference signal (PRS) configuration information,
   wherein the PRS configuration information defines a first time period between two instances of a PRS resource set, the PRS resource set comprising at least one PRS resource, and a second time period between two instances of the PRS resource within the PRS resource set, and
   wherein the first time period between two instances of the PRS resource set is based on a subcarrier spacing; and
   transmitting at least one PRS based on the PRS configuration information.

2. The method of claim 1, wherein the at least one PRS is transmitted based on at least one of beamforming or beam sweeping.

3. The method of claim 1, wherein each PRS resource comprises at least one symbol within a slot.

4. The method of claim 1, wherein the PRS resource set is repeated based on the first time period.

5. The method of claim 1, wherein the PRS configuration information defines the first time period and a starting location for the PRS resource set.

6. A method performed by a user equipment (UE) in a wireless communication system, the method comprising:
   receiving positioning reference signal (PRS) configuration information,
   wherein the PRS configuration information defines a first time period between two instances of a PRS resource set, the PRS resource set comprising at least one PRS resource, and a second time period between two instances of the PRS resource within the PRS resource set, and wherein the first time period between two instances of the PRS resource set is based on a subcarrier spacing; and receiving at least one PRS based on the PRS configuration information.

7. The method of claim 6, wherein the at least one PRS is received based on at least one of beamforming or beam sweeping.

8. The method of claim 6, wherein each PRS resource comprises at least one symbol within a slot.

9. The method of claim 6, wherein the PRS resource set is repeated based on the first time period.

10. The method of claim 6, wherein the PRS configuration information defines the first time period and a starting location for the PRS resource set.

11. A base station for a wireless communication system, the base station comprising:
a transceiver; and
a processor coupled to the transceiver and configured to:
transmit positioning reference signal (PRS) configuration information,
wherein the PRS configuration information defines a first time period between two instances of a PRS resource set, the PRS resource set comprising at least one PRS resource, and a second time period between two instances of the PRS resource within the PRS resource set, and
wherein the first time period between two instances of the PRS resource set is based on a subcarrier spacing; and
transmit at least one PRS based on the PRS configuration information.

12. The base station of claim 11, wherein the at least one PRS is transmitted based on at least one of beamforming or beam sweeping.

13. The base station of claim 11, wherein each PRS resource comprises at least one symbol within a slot.

14. The base station of claim 11, wherein the PRS resource set is repeated based on the first time period.

15. The base station of claim 11, wherein the PRS configuration information defines the first time period and a starting location for the PRS resource set.

16. A user equipment (UE) for a wireless communication system, the UE comprising:
a transceiver; and
a processor coupled to the transceiver and configured to:
receive positioning reference signal (PRS) configuration information,
wherein the PRS configuration information defines a first time period between two instances of a PRS resource set, the PRS resource set comprising at least one PRS resource, and a second time period between two instances of the PRS resource within the PRS resource set, and
wherein the first time period between two instances of the PRS resource set is based on a subcarrier spacing; and
receive at least one PRS based on the PRS configuration information.

17. The UE of claim 16, wherein the at least one PRS is received based on at least one of beamforming or beam sweeping.

18. The UE of claim 16, wherein each PRS resource comprises at least one symbol within a slot.

19. The UE of claim 16, wherein the PRS resource set is repeated based on the first time period.

20. The UE of claim 16, wherein the PRS configuration information defines the first time period and a starting location for the PRS resource set.

* * * * *